United States Patent
Kim et al.

(10) Patent No.: US 10,137,669 B2
(45) Date of Patent: Nov. 27, 2018

(54) VEHICLE INTERIOR MATERIAL AND MANUFACTURING METHOD THEREFOR

(71) Applicant: LG HAUSYS, LTD., Seoul (KR)

(72) Inventors: Heon-Jo Kim, Suwon-si (KR); Mu-Seon Ryu, Seoul (KR); Won-Kook Kim, Daejeon (KR); Chun-Ho Park, Cheongju-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 15/325,915

(22) PCT Filed: Jul. 14, 2015

(86) PCT No.: PCT/KR2015/007285
§ 371 (c)(1),
(2) Date: Jan. 12, 2017

(87) PCT Pub. No.: WO2016/010334
PCT Pub. Date: Jan. 21, 2016

(65) Prior Publication Data
US 2017/0173922 A1   Jun. 22, 2017

(30) Foreign Application Priority Data

Jul. 15, 2014   (KR) ........................ 10-2014-0088793

(51) Int. Cl.
*B32B 21/04* (2006.01)
*B32B 21/14* (2006.01)
(Continued)

(52) U.S. Cl.
CPC .............. *B32B 21/045* (2013.01); *B05D 1/40* (2013.01); *B05D 7/08* (2013.01); *B05D 7/54* (2013.01);
(Continued)

(58) Field of Classification Search
CPC ... B32B 21/045; B32B 21/14; B32B 2250/03; B32B 2255/08; B32B 2255/26;
(Continued)

(56) References Cited

U.S. PATENT DOCUMENTS 5,863,479 A * 1/1999 Ohsumi ............ B29C 45/14811
156/153
7,520,219 B2 * 4/2009 Cowan ..................... B41F 16/02
101/115
(Continued)

FOREIGN PATENT DOCUMENTS

JP   5-147184 A    6/1993
JP   2005313345 A * 11/2005
(Continued)

OTHER PUBLICATIONS

International Search Report dated Oct. 15, 2015 corresponding to International Application PCT/KR2015/007285.
(Continued)

*Primary Examiner* — Thao T Tran
(74) *Attorney, Agent, or Firm* — Hauptman Ham, LLP

(57) ABSTRACT

Provided is a vehicle interior material comprising coating layers formed on both surfaces of a veneer layer; a back layer on the coating layer of one surface of the veneer layer; and a front layer on the coating layer of the other surface of the veneer layer. Provided is a method of manufacturing a vehicle interior material comprising steps of: providing a veneer layer; forming coating layers on both surfaces of the veneer layer by applying and drying water-dispersible polyurethane dispersion or water-dispersible acrylic polyurethane dispersion on the both surfaces; pre-forming a real wood film layer prepared by forming the coating layers on the both surfaces of the veneer layer; forming a back layer on the coating layer of one surface of the veneer layer by primary insert molding; and forming a front layer on the
(Continued)

coating layer of the other surface of the veneer layer by secondary insert molding.

9 Claims, 2 Drawing Sheets

(51) Int. Cl.
    *B32B 27/30*     (2006.01)
    *B32B 27/36*     (2006.01)
    *B05D 7/00*     (2006.01)
    *B05D 7/08*     (2006.01)
    *B05D 1/40*     (2006.01)
    *C09D 151/08*     (2006.01)
    *B29C 45/00*     (2006.01)
    *B29C 45/16*     (2006.01)
    *B60R 13/02*     (2006.01)
    *B32B 9/04*     (2006.01)
    *B29C 45/14*     (2006.01)
    *B29K 33/00*     (2006.01)
    *B29K 69/00*     (2006.01)
    *B29K 675/00*     (2006.01)
    *B29K 711/14*     (2006.01)
    *B29L 31/30*     (2006.01)
    *C08K 3/36*     (2006.01)

(52) U.S. Cl.
    CPC ...... *B29C 45/0001* (2013.01); *B29C 45/0053* (2013.01); *B29C 45/1643* (2013.01); *B29C 45/1671* (2013.01); *B32B 9/04* (2013.01); *B32B 21/14* (2013.01); *B32B 27/308* (2013.01); *B32B 27/365* (2013.01); *B60R 13/02* (2013.01); *C09D 151/08* (2013.01); *B29C 45/1418* (2013.01); *B29C 45/14819* (2013.01); *B29C 2045/14868* (2013.01); *B29K 2033/08* (2013.01); *B29K 2069/00* (2013.01); *B29K 2675/00* (2013.01); *B29K 2711/14* (2013.01); *B29L 2031/30* (2013.01); *B32B 2250/03* (2013.01); *B32B 2255/08* (2013.01); *B32B 2255/26* (2013.01); *B32B 2605/003* (2013.01); *C08K 3/36* (2013.01)

(58) Field of Classification Search
    CPC ............ B32B 2605/003; B32B 27/308; B32B 27/365; B32B 9/04; B05D 1/40; B05D 7/08; B05D 7/54; B29C 2045/14868; B29C 45/0001; B29C 45/0053; B29C 45/1418; B29C 45/14819; B29C 45/1643; B29C 45/1671; B29K 2033/08; B29K 2069/00; B29K 2675/00; B29K 2711/14; B29L 2031/30; B60R 13/02; C08K 3/36; C09D 151/08
    USPC ........................................ 428/425.1; 264/642
    See application file for complete search history.

(56) References Cited

U.S. PATENT DOCUMENTS

2007/0102108 A1*   5/2007   Zheng ..................... B27D 1/04
                                                                                    156/272.2
2010/0040741 A1*   2/2010   Butler ..................... A61K 8/19
                                                                                     426/87

FOREIGN PATENT DOCUMENTS

| KR | 1020050061506 A | 6/2005 |
| KR | 10-0509900 B1 | 8/2005 |
| KR | 10-0830882 B1 | 5/2008 |
| KR | 10-0913811 B1 | 8/2009 |
| KR | 10-2009-0107835 A | 10/2009 |
| KR | 1020130035645 A | 4/2013 |

OTHER PUBLICATIONS

Korean Office Action dated Apr. 9, 2018 in connection with the counterpart Korean Patent Application No. 10-2014-0088793.

* cited by examiner

VEHICLE INTERIOR MATERIAL AND MANUFACTURING METHOD THEREFOR

CROSS REFERENCE TO RELATED APPLICATION

This application claims the priority of Korean Patent Application No. 10-2014-0088793, filed on Jul. 15, 2014, in the KIPO (Korean Intellectual Property Office). Further, this application is the National Phase Application of International Application No. PCT/KR2015/007285, filed on Jul. 14, 2015, which designates the United States and was published in Korean. Both of the priority documents are hereby incorporated by reference in their entireties.

TECHNICAL FIELD

The present invention relates to a vehicle interior material and a method of manufacturing the same.

BACKGROUND ART

In general, resin molded articles are utilized in console boxes, panels around an instrument panel and the like as automotive interior or exterior materials and also widely utilized in household electric appliances, such as a casing or cover of an electric rice cooker and the like.

In particular, a dashboard and an audio deck, a gear shift section, air bags, door locking units and window opening and closing units, etc., which are mounted near a driver's seat and a passenger's seat in the interior of an automobile, are mounted with various control devices and convenience devices, wherein interior finish panels are installed in gaps between outer sides of the various control devices and convenience devices and interior materials and hence finish the interior materials. Such interior materials become important factors in determining the external appearance of the interior of the automobile.

Since the vehicle interior materials have a significant effect on an aesthetic sense of the interior of the automobile, there is increasingly a demand for aesthetic external appearance under the current trend of individualization of automobiles.

Accordingly, recently, there is increasingly a demand for vehicle interior materials that are made of real wood products or the like in order to obtain a refined external appearance and luxurious texture.

DISCLOSURE

Technical Problem

It is one aspect of the present invention is to provide a vehicle interior material that is an injection molded article comprising coating layers on a veneer layer and a back layer or a front layer formed on both surfaces of the coating layers.

Another aspect of the present invention is to provide a method of manufacturing a vehicle interior material.

Technical Solution

In accordance with one aspect of the present invention, the present invention provides a vehicle interior material comprising coating layers formed on both surfaces of a veneer layer, wherein the coating layer of one surface of the veneer layer includes a back layer and the coating layer of the other surface of the veneer layer includes a front layer.

The coating layers may be formed from water-dispersible polyurethane dispersion or water-dispersible acrylic polyurethane dispersion.

The water-dispersible polyurethane dispersion or the water-dispersible acrylic polyurethane dispersion may comprise a solid content of about 10% to about 40% by weight.

The water-dispersible polyurethane dispersion or the water-dispersible acrylic polyurethane dispersion may further comprise a silica compound.

The water-dispersible polyurethane dispersion or the water-dispersible acrylic polyurethane dispersion may comprise 5 to 30 parts by weight of the silica compound with respect to 100 parts by weight of the solid content.

Thickness of the coating layers may be about 5 μm to about 50 μm.

Thickness of the veneer layer may be about 100 μm to about 600 μm.

Each of the front layer and the back layer comprises one or more thermoplastic resins selected from a group consisting of acrylic resin, polycarbonate resin, acrylonitrile-butadiene-styrene copolymer (ABS) resin, polyester resin, polymethyl methacrylate (PMMA) resin and a combination thereof.

In accordance with another aspect of the present invention, the present invention provides a method of manufacturing a vehicle interior material, comprising steps of: providing a veneer layer; forming coating layers on both surfaces of the veneer layer by applying and drying water-dispersible polyurethane dispersion or water-dispersible acrylic polyurethane dispersion on the both surfaces of the veneer layer; pre-forming a real wood film prepared by forming the coating layers on the both surfaces of the veneer layer; forming a back layer on the coating layer of one surface of the veneer layer by primary insert molding ; and forming a front layer on the coating layer of the other surface of the veneer layer by secondary insert molding.

The step of forming the coating layers may comprise a step of further adding a silica compound to the water-dispersible polyurethane dispersion or the water-dispersible acrylic polyurethane dispersion.

The silica compound may be formed by a sol-gel process.

The step of pre-forming the real wood film layer may be carried out at a temperature of 100° C. to 150° C. for about 20 seconds to about 120 seconds.

The method of manufacturing a vehicle interior material may further comprise a step of cutting unnecessary portions of the real wood film layer after pre-forming the real wood film layer.

The primary insert molding and the secondary insert molding may be performed at the same time.

The primary insert molding and the secondary insert molding may be performed at a temperature of about 200° C. to about 250 ° C.

Advantageous Effects

The vehicle interior material according to the present invention is excellent in heat resistance, adhesiveness and moldability and exhibits luxurious texture appearance.

Further, the method of manufacturing a vehicle interior material according to the present invention improves high process costs and a high defect rate due to complexity of manufacturing process and can reduce manufacturing cost.

BEST MODE

Hereinafter, preferred embodiments of the present invention are described in detail with reference to the accompanying drawings. The preferred embodiments are presented by way of examples, but not intended to limit the present invention. The present invention should be defined only by the spirit and scope of the appended claims.

Vehicle Interior Material

In one embodiment of the present invention, the present invention provides a vehicle interior material comprising coating layers formed on both surfaces of a veneer layer, wherein the coating layer of one surface of the veneer layer includes a back layer and the coating layer of the other surface of the veneer layer includes a front layer.

Since a product containing real wood used as a vehicle interior material can make automotive interior design luxurious, such a product containing real wood has been utilized in crash pads, door garnish and the like. However, since manufacturing process of such interior material containing real wood is complex and manufacturing cost thereof is high, there has been a difficulty in enlarging such interior material to the automotive market.

Therefore, manufacturing such a vehicle interior material by a manufacturing method that will be described later can result in improving high process costs and a high defect rate due to complexity of manufacturing process and reducing manufacturing cost. Further, the vehicle interior material manufactured by the inventive manufacturing method is excellent in heat resistance, adhesiveness and moldability and exhibits luxurious texture appearance.

Figure 1:
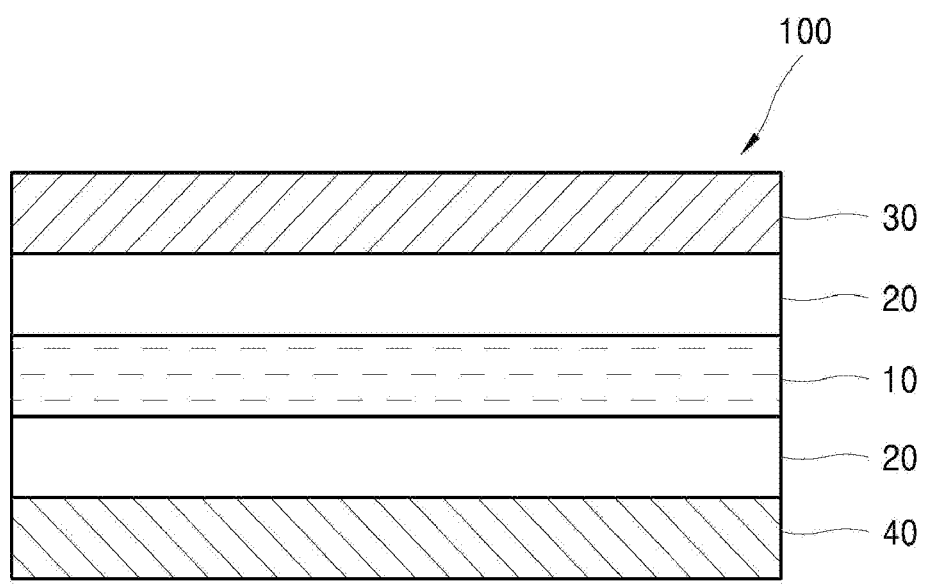
FIG. 1 illustrates a cross-sectional view of a vehicle interior material according to an embodiment of the present invention.

Referring to FIG. 1 illustrating a cross-sectional view of a vehicle interior material according to an embodiment of the present invention, a vehicle interior material 100 comprises coating layers 20 formed on both surfaces of a veneer layer 10, wherein the coating layer 20 of one surface of the veneer layer includes a back layer 40 and the coating layer of the other surface of the veneer layer includes a front layer 30.

The vehicle interior material ensures heat resistance, adhesiveness and moldability by comprising coating layers 20 on both surfaces of the veneer layer 10, wherein forming the coating layers on the both surfaces of the veneer layer results in a real wood film layer.

The coating layers may be formed from water-dispersible polyurethane dispersion or water-dispersible acrylic polyurethane dispersion, wherein the water-dispersible polyurethane dispersion and the water-dispersible acrylic polyurethane dispersion refers to a solution in which particles of water-dispersible polyurethane resin are uniformly dispersed and a solution in which particles of water-dispersible acrylic polyurethane resin are uniformly dispersed, respectively.

Therefore, the coating layer may comprise the water-dispersible polyurethane resin or the water dispersible acrylic polyurethane resin. The water-dispersible polyurethane resin or the water-dispersible acrylic polyurethane resin improves heat resistance of the coating layers so that thermal stability can be maintained at the pre-forming step, ensures improved adhesiveness and moldability at the time of injection molding, and is squeezed to the veneer layer so as to compensate drawbacks of the veneer layer.

The water-dispersible polyurethane resin is formed by synthesizing a polyol compound and an isocyanate compound, for example, by synthesizing polycarbonate diol, isophorone diisocyanate and dimethylol propionic acid. The water-dispersible polyurethane resin can easily penetrate into surface and pores of the veneer layer containing a lot of hydrophilic group so that it can impart elasticity to the veneer layer having a low moldability and facilitate forming of the veneer layer at the time of pre-forming and injection molding.

Further, the water-dispersible acrylic polyurethane resin may be formed by adding an acrylic monomer compound to the water-dispersible polyurethane resin, wherein the acrylic monomer compound may include, for example, methacrylate. Like the water-dispersible polyurethane resin, the water-dispersible acrylic polyurethane resin can easily penetrate into surface and pores of the veneer layer containing a lot of hydrophilic group so that it can impart elasticity to the veneer layer having a low moldability and facilitate forming of the veneer layer at the time of pre-forming and injection molding.

Moreover, it imparts thermal stability to the veneer layer to suppress a phenomenon that the veneer layer is stuck to the mold due to heat generated at the time of pre-forming and injection molding. In addition, it imparts adhesiveness between the front and back layers and the real wood film layer, which are formed by injection molding, to facilitate close adhesion between layers of the vehicle interior material.

The water-dispersible polyurethane resin dispersion or the water-dispersible acrylic polyurethane resin dispersion may comprise a solid content of about 10% to about 40% by weight.

If the solid content is contained at an amount of less than about 10% by weight, the resin cannot penetrate sufficiently into the surface and pores of the veneer layer and hence moldability is lowered. On the other hand, if the solid content is contained at an amount of more than about 40% by weight, thickness of the coating layers is thickened and hence a configuration resulting from molding cannot be maintained but restored. Accordingly, maintaining the above mentioned range of the solid content is advantageous for securing moldability of the veneer layer.

The coating layer may further comprise a silica compound. The silica compound refers to a compound containing silica as a main component, which can improve heat resistance of the coating layers. In other words, the water-dispersible polyurethane dispersion or the water-dispersible acrylic polyurethane dispersion for forming the coating layers may further comprise a silica compound.

Specifically, the water-dispersible polyurethane dispersion or the water-dispersible acrylic polyurethane dispersion may comprise 5 to 30 parts by weight of the silica compound, for example, 5 to 20 parts by weight of the silica compound, with respect to 100 parts by weight of the solid content. The silica compound contained within the above content range can improve heat resistance of the coating layers and heat dissipation and heat resistance of the veneer layer, so that it is possible to suppress the phenomenon that the veneer layer is fumed due to heat transferred from the metal mold at the time of pre-forming and injection molding.

Thickness of the coating layers may be about 5 μm to about 50 μm. If the thickness of the coating layers is less than about 5 μm, moldability of the veneer layer is lowered. On the other hand, if the thickness of the coating layers is more than about 50 μm, a configuration resulting from molding cannot be maintained but restored. Accordingly, the configuration resulting from molding can be maintained by maintaining the above mentioned range of the thickness.

The veneer layer refers to real wood, which exhibits gorgeous and luxurious appearance compared with ordinary patterned plywood, plastic plywood and the like and hence gives refined appearance and aesthetic sense in the interior of automobiles.

Thickness of the veneer layer may be about 100 μm to about 600 μm, for example, about 150 μm to about 250 μm. Since a real wood film layer is prepared by forming coating layers on both surfaces of the veneer layer, it cannot warp in spite of its thin thickness.

For example, real wood that is a veneer layer may comprise a single natural wood layer wherein the natural wood layer includes a veneer formed by sawing cypress wood, walnut wood, afrormosia wood, birdseye maple wood, etc. into a thin panel.

In addition, the veneer layer may comprise a natural wood layer formed on a substrate wherein the substrate may comprise kraft paper, paper made from pulp and the like and minimizes a splitting phenomenon and cracking of the natural wood layer.

According to a method of manufacturing a vehicle interior material, coating layers can be formed on both surfaces of the veneer layer in a simple process and as a result a real wood film layer that exhibits a refined appearance can be obtained.

The coating layer of one surface of the veneer layer includes a back layer 40 and the coating layer of the other surface of the veneer layer includes a front layer 30. The front and back layers are layers formed by injection molding thermoplastic resin on one surface or the other surface of the coating layer, and serve as a support for maintaining durability and shape of the vehicle interior material and exhibit and the front layer, in particular, also realizes an effect of interior decoration.

Each of the front layer and the back layer comprises one or more thermoplastic resins selected from a group consisting of acrylic resin, polycarbonate resin, acrylonitrile-butadiene-styrene copolymer (ABS) resin, polyester resin, polymethyl methacrylate (PMMA) resin and a combination thereof. Thickness of each of the front and back layers may be about 1 mm to about 3 mm.

Method of Manufacturing a Vehicle Interior Material

Another embodiment of the present invention provides a method of manufacturing a vehicle interior material, comprising steps of: providing a veneer layer; forming coating layers on both surfaces of the veneer layer by applying and drying water-dispersible polyurethane dispersion or water-dispersible acrylic polyurethane dispersion on the both surfaces; pre-forming a real wood film layer prepared by forming the coating layers on the both surfaces of the veneer layer; forming a back layer on the coating layer of one surface of the veneer layer by primary insert molding; and forming a front layer on the coating layer of the other surface of the veneer layer by secondary insert molding.

Figure 2:
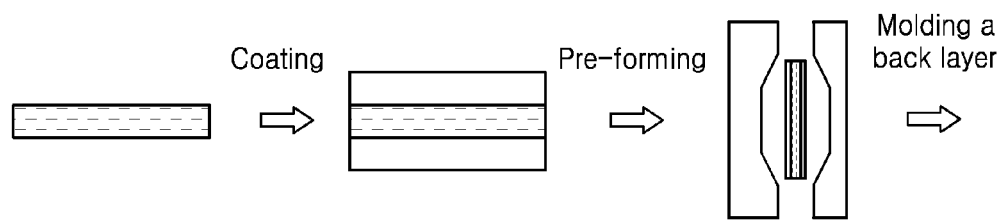
FIG. 2 is a diagrammatic view showing a method of manufacturing a vehicle interior material, according to an embodiment of the present invention.
Figure 2:
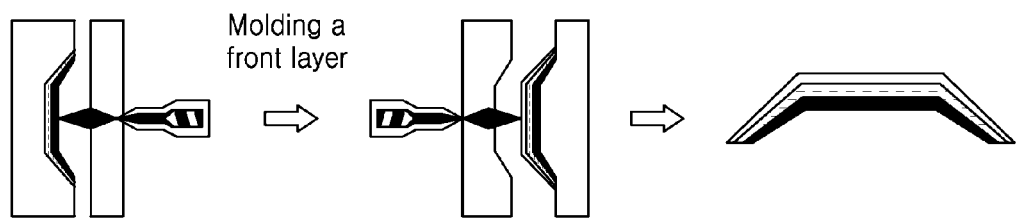

In FIG. 2, a method of manufacturing a vehicle interior material according to an embodiment of the present invention is diagrammatically illustrated. Referring to this figure, the method of manufacturing a vehicle interior material comprises the step of forming coating layers on both surfaces of a veneer, the step of pre-forming the veneer layer having the coating layers formed thereon, the step of injection molding a back layer and the step of injection molding a front layer, thereby producing a vehicle interior material that is an injection molding article.

The coating layers formed on both surfaces of the veneer layer are intended to secure heat resistant at the time of pre-forming and adhesiveness at the time of injection molding. The coating layers can be formed by coating on the both surfaces of the veneer layer water-dispersible polyurethane dispersion or water-dispersible acrylic polyurethane dispersion containing a solid content of about 10% to about 40% by weight with a thickness of about 20 μm to about 50 μm by means of a bar coater (e.g., Mayer bar coater) and then drying the coated resin at about 100° C. to about 150° C. for about 2 minutes to about 5 minutes in an oven.

The step of forming the coating layer may comprise a step of further adding a silica compound to the water-dispersible polyurethane dispersion or the water-dispersible acrylic polyurethane dispersion.

The silica compound may be added in order to improve heat resistance of the coating layers. In this case, the silica compound may be added at an amount of 5 to 30 parts by weight with respect to 100 parts by weight of the solid content in the water-dispersible polyurethane dispersion or the water-dispersible acrylic polyurethane dispersion.

The silica compound may be formed by a sol-gel process. The sol-gel process is a process for forming a compound from a sol (or solution) obtained by hydrolysis via a gel. The silica compound may be silica sol formed by the sol-gel process.

The coating layers are formed on the both surfaces of the veneer layer to secure heat resistance, adhesiveness and moldability of the veneer layer. Thereafter, the method may perform a step of pre-forming a veneer layer having coating layers formed on both surfaces thereof, i.e., a real wood film layer.

The pre-forming step is a process for securing a suitable form before proceeding injection molding and may be carried out at a temperature of 100° C. to 150° C. for about 20 seconds to about 120 seconds.

The real wood film layer that is the veneer layer having coating layers formed on both surfaces thereof can be formed in a suitable shape to be applied to the injection molding through the pre-forming step. By performing the pre-forming step at the temperature and time range established as above, it is possible to minimize splitting and folding phenomena of the real wood film layer.

The method of manufacturing a vehicle interior material may further comprise a step of cutting unnecessary portions of the real wood film layer after pre-forming the real wood film layer.

When a form to be applied to injection molding is given to the real wood film layer through the pre-forming step, unnecessary portions that must not be included in a molded article may be generated. In this case, it is possible to cut the unnecessary portions. The cutting can be performed through a known cutting process such as laser cutting, knife cutting and the like.

An additional layer is formed on the coating layer(s) of one surface or the other surface of the pre-formed real wood film layer by primary insert molding or secondary insert molding, thereby obtaining a final molded article that can be used as a vehicle interior material.

A back layer may be formed through the primary insert molding while a front layer may be formed through the secondary insert molding, wherein the primary and secondary insert moldings may be performed separately, or at the same time. In case where the primary and secondary insert moldings are performed at the same time, the time required to mold is shortened, and a constant temperature condition is given to the real wood film layer so that adhesion of the front and back layers is carried out actively.

The primary insert molding and the secondary insert molding may be performed at a temperature of about 200° C. to about 250° C. The temperature at which the insert molding is performed can be controlled depending on the thermoplastic resin provided, wherein the thermoplastic resin comprises one or more resins selected from a group consisting of acrylic resin, polycarbonate resin, acrylonitrile-butadiene-styrene copolymer (ABS) resin, polyester resin, polymethyl methacrylate (PMMA) resin and a combination thereof.

If the temperature is less than about 200° C., flowability of the thermoplastic resin is lowered and thus it is not easy for the front and back layers to be formed. On the other hand, if the temperature exceeds about 250° C., the real wood film layer has soot on it, or is stuck to the metal mold.

The front layer is usually formed by the secondary insert molding. However, the front layer may be formed through a polyurethane cast molding process, a spray process, a powder coating process or the like.

A specific example of the present invention is presented below. However, the example described below is merely intended to exemplify or describe the present invention specifically, and the present invention should not be limited by the example.

Example

A veneer layer having a thickness of 150 μm is prepared, using birdseye maple wood. Water-dispersible acrylic polyurethane dispersion containing a solid content of 25% by weight and silica particles of 10% by weight with respect to the solid content was coated on both surfaces of the veneer layer by means of a bar coater (Mayer bar coater) and then the coated resin was dried at 130° C. for 4 minutes in a oven and with the result that coating layers having a thickness of 20 μm were formed.

The veneer layer having coating layers formed on both surfaces thereof, i.e., a real wood film layer was pre-formed to a suitable form to be applied to injection molding at a temperature of 130° C. for 100 seconds and then portions unnecessary for a complete form were cut off.

Thereafter, polycarbonate resin was injection molded on the coating layer of one surface of the real wood film layer at 200° C. to 230° C. by insert molding to form a back layer, while poly methyl methacrylate resin was injection molded on the coating layer of the other surface of the real wood film layer at 200° C. to 220° C. by insert molding to form a front layer. As a result, a vehicle interior material was produced.

Figure 3:
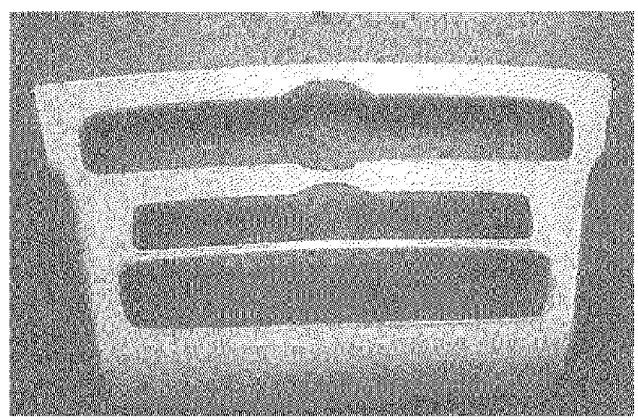
FIG. 3 is a photographic image of a vehicle interior material manufactured in one example according to the present invention.

In FIG. 3, a photographic image of the vehicle interior material produced in this example is shown.

The invention claimed is:

1. A vehicle interior material comprising:
coating layers formed on both surfaces of a veneer layer, wherein the coating layers are formed from water-dispersible polyurethane dispersion or water-dispersible acrylic polyurethane dispersion, wherein
the water-dispersible polyurethane dispersion or the water-dispersible acrylic polyurethane dispersion comprises a solid content of 10% to 40% by weight,
the water-dispersible polyurethane dispersion or the water-dispersible acrylic polyurethane dispersion further comprises a silica compound, and
the water-dispersible polyurethane dispersion or the water-dispersible acrylic polyurethane dispersion comprises 5 to 30 parts by weight of the silica compound with respect to 100 parts by weight of the solid content of the dispersion;
a back layer on the coating layer of one surface of the veneer layer, and
a front layer on the coating layer of the other surface of the veneer layer,
wherein each of the front layer and the back layer comprises one or more thermoplastic resins, and wherein a thickness of the coating layers is 5 μm to 50 μm.

2. The vehicle interior material of claim 1, wherein a thickness of the veneer layer is 100 μm to 600 μm.

3. The vehicle interior material of claim 1, wherein the one or more thermoplastic resins are selected from the group consisting of acrylic resin, polycarbonate resin, acrylonitrile-butadiene-styrene copolymer (ABS) resin, polyester resin, polymethyl methacrylate (PMMA) resin and a combination thereof.

4. A method of manufacturing a vehicle interior material, comprising steps of:
providing a veneer layer;
forming coating layers on both surfaces of the veneer layer by applying and drying water-dispersible polyurethane dispersion or water-dispersible acrylic polyurethane dispersion on the both surfaces;
pre-forming a real wood film layer prepared by forming the coating layers on the both surfaces of the veneer layer;
forming a back layer on the coating layer of one surface of the veneer layer by primary insert molding; and
forming a front layer on the coating layer of the other surface of the veneer layer by secondary insert molding,
wherein the step of forming the coating layers comprises a step of further adding a silica compound to the water-dispersible polyurethane dispersion or the water-dispersible acrylic polyurethane dispersion,
the water-dispersible polyurethane dispersion or the water-dispersible acrylic polyurethane dispersion comprises a solid content of 10% to 40% by weight,
the water-dispersible polyurethane dispersion or the water-dispersible acrylic polyurethane dispersion comprises 5 to 30 parts by weight of the silica compound with respect to 100 parts by weight of the solid content of the dispersion, and
each of the front layer and the back layer comprises one or more thermoplastic resins; and a thickness of the coating layers is 5 μm to 50 μm.

5. The method of claim 4, wherein the silica compound is formed by a sol-gel process.

6. The method of claim 4, wherein the step of pre-forming the real wood film layer is carried out at a temperature of 100° C. to 150° C. for 20 seconds to 120 seconds.

7. The method of claim 4, further comprising a step of cutting unnecessary portions of the real wood film layer after pre-forming the real wood film layer.

8. The method of claim 4, wherein the primary insert molding and the secondary insert molding are performed at the same time.

9. The method of claim 4, wherein the primary insert molding and the secondary insert molding are performed at a temperature of 200° C. to 250° C.

* * * * *